(12) United States Patent
Hastings

(10) Patent No.: US 6,763,045 B2
(45) Date of Patent: Jul. 13, 2004

(54) APPARATUS FOR AND METHOD OF TARGETING

(75) Inventor: Stephen Alan Hastings, Munich (DE)

(73) Assignee: Raylase AG, Wessling (DE)

( * ) Notice: Subject to any disclaimer, the term of this patent is extended or adjusted under 35 U.S.C. 154(b) by 0 days.

(21) Appl. No.: 10/191,542

(22) Filed: Jul. 10, 2002

(65) Prior Publication Data

US 2004/0007563 A1 Jan. 15, 2004

(51) Int. Cl.⁷ .............................................. H01S 3/13
(52) U.S. Cl. .................................... 372/24; 372/98
(58) Field of Search ...................... 372/24, 98

(56) References Cited

U.S. PATENT DOCUMENTS

| | | | |
|---|---|---|---|
| 3,657,707 A | 4/1972 | McFarland et al. | |
| 4,547,651 A | 10/1985 | Maruyama | |
| 4,775,220 A | 10/1988 | Penkethman | |
| 4,952,034 A | * 8/1990 | Azusawa et al. | 349/22 |

FOREIGN PATENT DOCUMENTS

| | | |
|---|---|---|
| DE | 41 06 151 | * 11/1991 |
| EP | 0393676 | 10/1990 |
| EP | 0393677 | 10/1990 |
| EP | 0577358 | 1/1994 |
| EP | 0671238 | 9/1995 |
| WO | WO89/11948 | 12/1989 |

* cited by examiner

Primary Examiner—Leon Scott, Jr.
(74) Attorney, Agent, or Firm—Duane Morris LLP

(57) ABSTRACT

An apparatus for laser beam targeting and method of laser cutting or marking of an article is disclosed. In one aspect of the invention, the laser beam targeting apparatus comprises at least one laser scan head comprising at least one motor driven deflector for scanning a linearly polarized laser beam across a target, and a polarization control device comprising at least one Brewster plate wherein the polarization control device rotates the Brewster window around an axis parallel to the laser beam to thereby gradually transmit or deflect the laser beam in order to control the level of laser beam energy scanning across the target in accordance with the movement of the at least one deflector and a laser scanner. In another aspect of the invention, an article for laser cutting or marking is processed by at least one laser scan head comprising at least one motor driven deflector for scanning a linearly polarized laser beam across the article, and a polarization control device which rotates at least one Brewster plate around an axis parallel to the laser beam to gradually transmit or deflect the laser beam to control the level of laser beam energy scanning across the article in accordance with the movement of the at least one deflector.

21 Claims, 5 Drawing Sheets

APPARATUS FOR AND METHOD OF TARGETING

FIELD OF INVENTION

The present invention relates to a method of laser-cutting or marking an article and to an apparatus for laser beam targeting.

BACKGROUND OF THE INVENTION

Current lasers scanning technology involves two techniques:

1) Post-objective targeting using galvanometric motor scanning mirrors, where the laser beam first passes through an objective or "z" lens in order to keep the beam at optimum focus at a target plane, upstream of the X and Y scanning mirrors, wherein the focused laser beam, by linear displacement, follows the shape of a structure, such as a label to be marked or cut. Linear displacement of the focused laser beam is controlled by digital signals, representing X and Y laser beam positions on the target plane and directly corresponding to signals taken from the X and Y galvanometric motors, which in turn allowed a laser beam to be directed onto the article; or 2) Pre-objective targeting using galvanometric motor scanning mirrors, where the beam is kept in focus at the target plane by passing through a scanning or flat field or f-theta lens down-stream of the galvanometric motor controlled mirrors.

In both of the above systems, the laser beam is directed on a X galvanometric motor controlled mirror, which deflects the laser beam onto an Y galvanometric motor controlled mirror, which in turn reflects the laser beam towards the target plane. The X and Y galvanometric motors each comprise a central spindle which is held within a magnetic field and onto which a deflecting mirror is mounted. By sending a signal to increase or decrease the magnetic field, the spindle can be rotated clockwise and anti-clockwise at high speeds and with great accuracy and repeatability. By controlling an X and an Y galvanometric motor in combination with laser source switching, an image can be scanned onto the target area.

Disadvantageously, current laser beam scanning targeting techniques commonly involve the switching of the laser source in direct conjunction to the laser beam being scanned across a target plane. Because e.g. a carbon dioxide laser source cannot produce plasma energy or lase at the lowest ten percent of maximum laser energy, when the scanning speed at the target is lower than 10% of the maximum scanning speed, the resulting laser process will have more energy striking the target than is required to effect a uniform depth of processing. This problem is illustrated with respect to FIG. 5.

FIG. 5 shows a graph illustrating the problem of acceleration, maximum speed and deceleration of a galvanometric motor determining the speed of movement of the laser across the target to laser beam intensity. As shown in FIG. 5, during the acceleration and the deceleration phase of the galvanometric motor the speed of movement of the laser beam across the target plane is inherently slower than at maximum speed. Accordingly, the laser beam output power has to be increased and decreased in proportion to the motor speed to guarantee a uniform laser beam intensity on the target surface. This will not be possible with the common carbon dioxide laser which at minimum speed generates a laser beam intensity which will be either zero or too high.

Further, scanning targeting techniques using current carbon dioxide lasers commonly suffer from larger than required laser beam spot diameters at the target plane. This is due to the relationship between the diameter of the unfocused laser beam, the size of the X and Y mirrors, the mass of the X and Y mirrors in relation to the galvanometric motors, which control positioning and positional tolerance and speed, the focusing ability of the f-theta lens and the wavelength of the carbon dioxide generated laser beam energy.

Current alternative carbon dioxide laser beam scanners use, for example, the SK1020 scan head manufactured by SCANLAB AG of Puchheim, Germany, which when used in conjunction with a laser source, commonly controls that laser source by simply switching on the laser beam energy to a pre-determined power output level when a mark is required to be scanned onto the target. When the scan reaches the end or completion of that mark the laser beam energy is simply switched off again. Although, electronic delays and pulse suppression can be effected to assist the uniformity of the required mark, there are no accounts for scanning acceleration or deceleration at the target plane.

Disadvantageously, the above mentioned scan heads have no controls to ramp the laser beam power at the target in direct relationship to the speed of the combined X and Y galvanometric scanning, as explained above with respect to FIG. 5.

Further, the current scan heads have relatively large laser beam spot sizes on the target plane. The input laser beam diameter should be kept relatively small in order to minimize the size and mass of the X and Y scanning mirrors thereby restricting the inertia that said X and Y scanning mirrors will load onto the galvanometric motors.

Also, the current scan heads have no control over the target plane laser beam profile, therefore there is no accounting for or control over the natural Gaussian profile of the laser beam. Disadvantageously, this natural Gaussian profile is detrimental to the accurate processing of fine graphics art and other materials because it will produce a laser beam at the target plane of higher intensity in the center of said laser beam and lower intensity at the edges.

Another disadvantage of the prior art scan heads, controlling laser beam energy by switching is that the switching on and off of a laser source to match galvanometric scanning is detrimental to the longevity of that laser source and compounds attempts to maintain that laser source's power output stability.

Finally, the above method of laser source control by switching to match galvanometric scanning only allows for the duplication of scanning heads processing from a single laser source, and does not allow for any configuration of scanning heads to form an array whereby each scanning head can take a part of the total target area.

U.S. Pat. No. 4,952,034 discloses a method of writing a liquid crystal display with a laser beam, wherein the intensity of the laser beam applied to the liquid crystal is controlled by a laser beam varying unit. The intensity of the laser beam irradiated on the liquid crystal is changed with the deflection speed of the optical axis, wherein the change of laser beam intensity is obtained by a acousto-optical modulation. Modulating the laser energy into ultrasonic pulses of varying frequency is used for thermal writing of a liquid crystal display at constant laser beam energy.

WO 89/11 948 relates to a method of laser beam steering to optimize the efficiency of laser welding and other laser material processing. According to this reference, the polarization of laser beam energy is steered in the same direction as the processing path across a target material; further, this document also relates to the benefits of striking the material at or near the Brewster angle for said material being processed.

EP 0 393 676 discloses a solid imaging system, wherein a laser beam is modulated in accordance with the laser beam sleep speed to maintain a substantially constant layer depth at all speeds. The modulator preferably uses an acousto-optical switch or an electro-optical switch. The electro-optical switch is based on a crystal that changes optical polarity when voltages are applied.

It is the object of the present invention to provide a method of laser cutting or marking an article and a laser beam targeting apparatus whereby the transmission of a beam of laser energy is finely controlled in direct relationship to the speed at which two galvanometric motor driven mirrors deflect said laser beam and scan that laser beam onto a target plane. According to a further aspect, the present invention relates to a method and an apparatus for decreasing the laser beam spot diameter at the target plane.

SUMMARY OF THE INVENTION

To solve the above object the present invention provides a method of laser cutting or marking an article, wherein the article is processed by at least one laser scan head, said laser scan head comprising motor driven deflection means for scanning a linearly polarised laser beam across the article and a polarisation control device, wherein the polarisation control device rotates at least one Brewster plate around an axis which is parallel to the laser beam to gradually transmit or deflect the laser beam to control the level of laser beam energy of the laser beam scanning across the article in accordance with the movement of the deflection means.

According to a further aspect, the invention provides a laser beam targeting apparatus, comprising at least one laser scan head, said laser scan head comprising motor driven deflection means for scanning a linearly polarised laser beam across a target and a polarisation control device comprising at least one Brewster plate, wherein the polarisation control device rotates said at least one Brewster window around an axis which is parallel to the laser beam to gradually transmit or deflect the laser beam to control the level of laser beam energy of the laser beam scanning across the target in accordance with the movement of the deflection means and a laser scanner comprising such a laser beam target apparatus.

Preferred embodiments of the invention are defined in the dependent claims.

In a particularly preferred embodiment, the polarization or attenuation control device comprises at least one and, in particular, one or two Brewster plates which can be rotated at an angle between 0 and 90° to control laser beam transmission between 0% and 100%. The rotation of the Brewster plates is synchronized to the rotation of the X and Y mirrors deflecting the laser beam for targeting the scanning surface. In the present invention, the laser beam may even be emitted continuously because each Brewster plate can be adjusted to 0% transmission to deflect the laser beam to a beam dump, wherein movement of the deflecting mirrors and the Brewster plates will be started simultaneously.

U.S. Pat. No. 4,775,220 describes the use of a Brewster window which acts as a beam splitter to measure the intensity of a laser beam and feed back an beam intensity output signal to an electronic control. In accordance with the feedback signal, a beam attenuation module adjusts the amount of attenuation of the laser beam so that the output beam energy is maintained within about 5% of the desired energy. In this reference, the Brewster window is stationary to always deflect an equal portion of the laser beam into the measuring device. If, in this reference, the Brewster window were rotated a different percentage of the laser beam would be measured which would compromise the control method of this reference. While U.S. Pat. No. 4,775,220 teaches the use of a Brewster window in a laser system, said Brewster window is not used for attenuating the laser beam.

The method of controlling the laser beam transmission according to the present invention is by one or two ZnSe Brewster plates rotated by motorised control around 90° of the single direction polarised input laser beam axis. By setting said Brewster plates at the relevant Brewster angle said plates will transmit 100% of the laser beam energy when aligned to the polarisation of the input laser beam and gradually lower the transmission to 0% of said laser beam when rotated through 90° around the laser beam axis by the formula: Transmission=$COS^4\Phi$.

Advantageously, because this method can adjust laser transmission independently and by electronic control methods automatically dependent upon combined X and Y galvanometric motor speeds it can react accurately in terms of laser power requirements to the material to be processed.

According to the present invention there is provided an apparatus and a method for targeting a carbon dioxide laser beam whereby a beam of laser energy is optically expanded immediately prior the X and Y galvanometric motor driven mirrors thereby growing in diameter to the input side of an f-theta focussing lens assembly thereby focussing the laser beam to the target plane at a smaller diameter than possible using conventional methods.

Advantageously, increasing the input laser beam diameter to the f-theta lens has the effect of decreasing the target plane laser beam spot size, thereby decreasing the level of laser beam energy required to process and, additionally decreasing the laser beam processing width and the amount of waste material to be extracted and filtered by the actions of the process.

According to the present invention there is provided a method of combining a beam shaping or axicon lens with the optical laser beam expander so that the natural Gaussian profile of the carbon dioxide input laser beam can be profiled into a laser beam of more even power distribution at the target plane.

Advantageously, the aforementioned features allow for the use of more than one scanning head from a single laser source of continuous power output whereby each scanning head can be functioning independently of other scanning heads.

Advantageously, the polarisation control device can act over the full range of transmission within a time scale of a few hundred microseconds and is digitally or electronically controlled relative to the combined speeds of the galvanometric motors contained within the scan head.

Advantageously, because each scan head can adjust laser transmission independently and automatically dependent upon its own combined galvanometric motor speeds it can react accurately in terms of laser power requirements to the material to be cut and can be duplicated into an array of scanning heads either duplicating a single process or each scanning head taking part of a single process.

Further advantages provided by this laser targeting method include that, for example, two combined scan heads that each can target an area of 200 mm×200 mm mounted together in a 1×2 configuration or array can target an area of 400 mm×200 mm from a single digital design area which has been split by software into the two corresponding areas each targeted by each scan head.

Advantageously, said array can process any area smaller than the total target area so that if, for example, an area of only 50 mm×200 mm is required to be cut, only one of the two scan head can be employed to execute the task whilst the remaining scan head can remain effectively off with its respective equal split of the original laser beam being blocked by its respective polarisation control devices maintaining zero laser beam transmission and effectively closed.

Advantageously, said array is mounted close enough to the target to maintain relatively small beam spot sizes and allow for greater aerodynamic control and evacuation of waste gases created by laser processing.

Advantageously, as the array requires only one laser beam to be split equally employing beam splitting optics it is far simpler to control said beam propagation with regard to plasma fluctuations employing optical laser beam monitoring and control methods.

Advantageously, said high speed attenuator or polarisation control device can control laser beam transmission to the target with a very high degree of accuracy to maintain the correct laser beam intensity at said target in direct relationship to combined X and Y galvanometric motor scanning speeds, including during the critical periods of combined X and Y galvanometric motor acceleration and deceleration.

Advantageously, said polarisation control devices can be further controlled by overriding their input control signals to varying percentage ranges which effect to further allow for various types of material processing, for example, die or through cutting, kiss or part-depth cutting, marking of the surface and non-marking or non-processing or jumping when a galvanometric scanner or both the galvanometric scanners are moving targeting points between processing lines and where the material is not to be marked in any way.

Advantageously, said method employs a 'front end' operator or machine operators' console digital design field which represents the entire target area covered by the said array whilst internal 'hidden' digital means or electronics hardware means or automatic digital design field not seen or controlled by the machine operator divide the entire target area into separate target areas targeted by each individual scan head and control the separate scanning heads targeting relative to their part of the entire target area. In this method each part of the entire target area targeted by each scanning head function independently and at the same time as each of the other scanning heads.

Advantageously, said method employs electronic or digital control of the original laser beam power output dependent upon material type thereby requiring no further control of the X and Y galvanometric motors or polarisation control devices for differing material types.

Advantageously, said scanning head array apparatus includes means for scanning said laser beam onto the target. Said apparatus may, for example, be Cambridge Technology Inc. galvanometric motors, models 6350, 6450, 6650, 6400, 6900 and/or 6880, X-Y mounts, models 6103505R, 6103510R, 6104512L, 6104512R, 6106520R, 6106530R and/or 6109050R, and control electronics, models 65335, 65335B, 65335H, 65340, 65340B, 65340H, 65345, 65345B, 65345H, 65365, 65365B and/or 65365H.

Advantageously, said scanning head array apparatus includes means for high speed attenuation of said laser beam entering each set of galvanometric motor controlled mirrors in each scanning head. Said attenuation means, for example, may be by implemented using V&S Scientific (London) Ltd.'s ZnSe Brewster plates affixed into a high speed polarisation control device.

Advantageously, said scanning head array apparatus includes means for directing and focusing said laser beam onto the target. Said apparatus may, for example, be V&S Scientific (London) Ltd.'s X-Y mirrors and f-theta lenses.

SHORT DESCRIPTION OF THE DRAWINGS

Preferred embodiments of the present invention will be described with reference to the accompanying drawings, in which.

DETAILED DESCRIPTION OF THE PREFERRED EMBODIMENT

Figure 1:
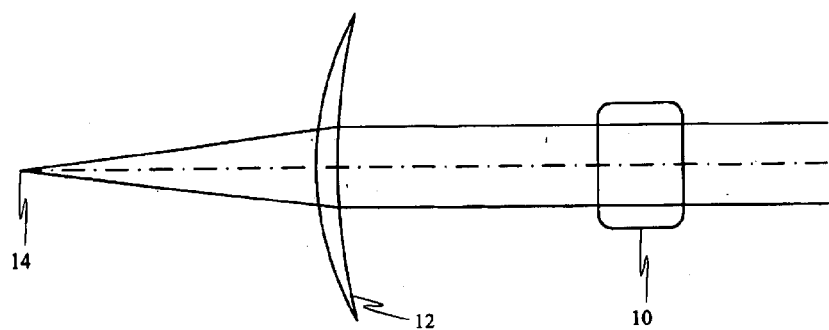
FIG. 1 shows a diagram of a small diameter laser beam transmitted through a mirror and an f-theta lens.

FIG. 1 shows a diagram illustrating a small diameter input laser beam in relationship to a small mirror size, transmitted through the mirror and a downstream f-theta lens to a focus point on a target plane.

Figure 2:
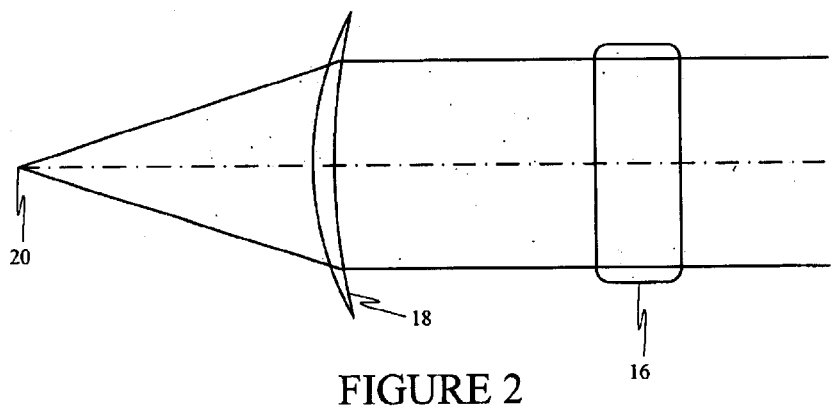
FIG. 2 shows a second diagram of a larger diameter laser beam transmitted through a mirror and an f-theta lens.

FIG. 2 shows a further diagram of a larger diameter input laser beam in relationship to a larger mirror size, transmitted through the mirror and a downstream f-theta lens to a focus point on a target plane.

Figure 3:
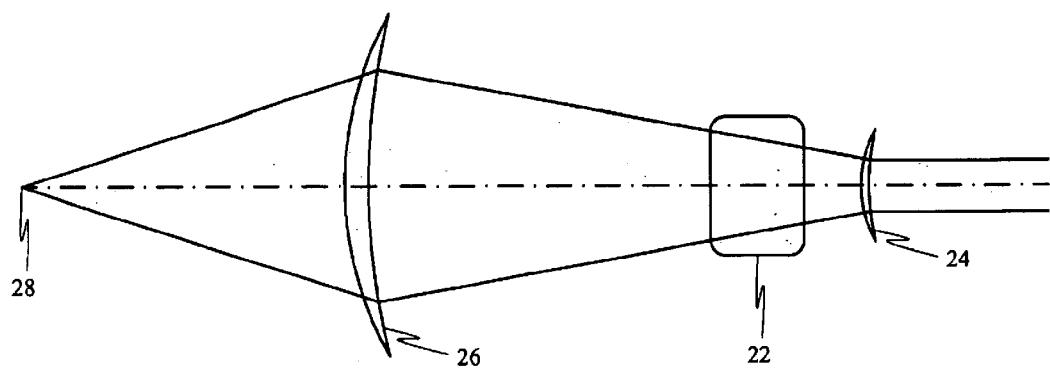
FIG. 3 shows a diagram of a similar arrangement as in FIG. 1 with an additional beam expansion optic.

FIG. 3 shows a diagram of a small diameter input laser beam in relationship to a small mirror 22, similar to the mirror 10 of FIG. 1, wherein an upstream beam expansion optic 24 is used to take into account the laser beam spot diameter reduction on the target plane due to the small beam diameter and the f-theta lens 26 for focusing the laser beam to a focus point 28 on the target plane. As can be seen from a comparison of FIGS. 1, 2, and 3 the beam expansion optic 24 has the effect of creating a similarly focused laser beam spot on the target plane as if a larger diameter laser beam and a larger mirror had been used.

Figure 4:
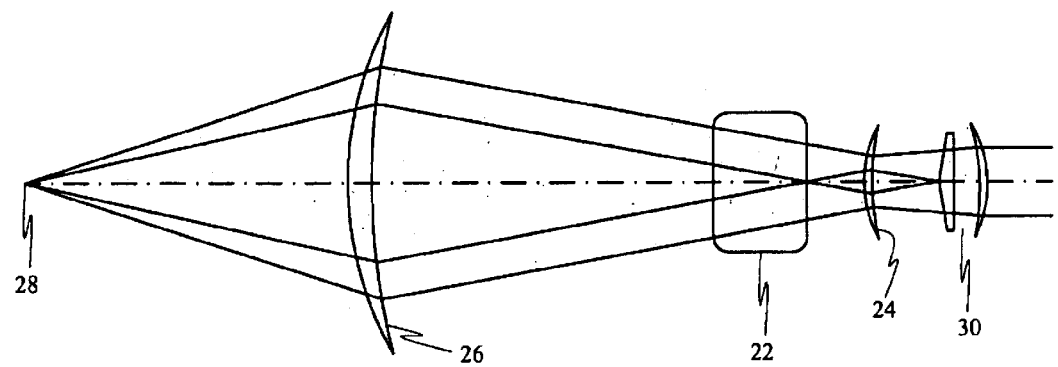
FIG. 4 shows a diagram of a similar arrangement as in FIG. 1 with an additional beam diameter reduction optic and beam shaping optic.

FIG. 4 shows yet another diagram in which a small diameter input laser beam is shown in relation to a small mirror, similar to those of FIGS. 1 and 3. In FIG. 4 the same reference numbers are used to designate the same or similar features as in the preceding figure. The difference between FIGS. 3 and 4 is that, upstream of the beam expansion optic 24 an axicon beam shaping optic 30 is introduced, followed by the beam expansion optic 24, the mirror 22 an the f-theta lens 26, to account for the smaller laser beam spot diameter on the target plane as well as laser beam profiling on the target plane to achieve a more even intensity distribution throughout the laser beam spot.

Both of the embodiments of FIGS. 3 and 4 provide a beam expansion optic 24 immediately prior to the X and Y galvanometric motor driven mirrors 22 thereby increasing in diameter the laser beam to the input side of the f-theta focusing lens 26 thereby focusing the laser beam to the target plane at a smaller diameter than possible using conventional mechanisms. The increase of the input laser beam diameter to the f-theta lens 26 has the effect of decreasing the laser beam spot size on the target plane, thereby decreasing the level of laser beam energy required to process and, additionally, decreasing the laser beam processing width and the amount of waste material to be extracted and filtered by the actions of the process. Additionally, the axicon beam shaping optic 30 of FIG. 4 has the effect of providing a more even power distribution at the target plane.

Figure 5:
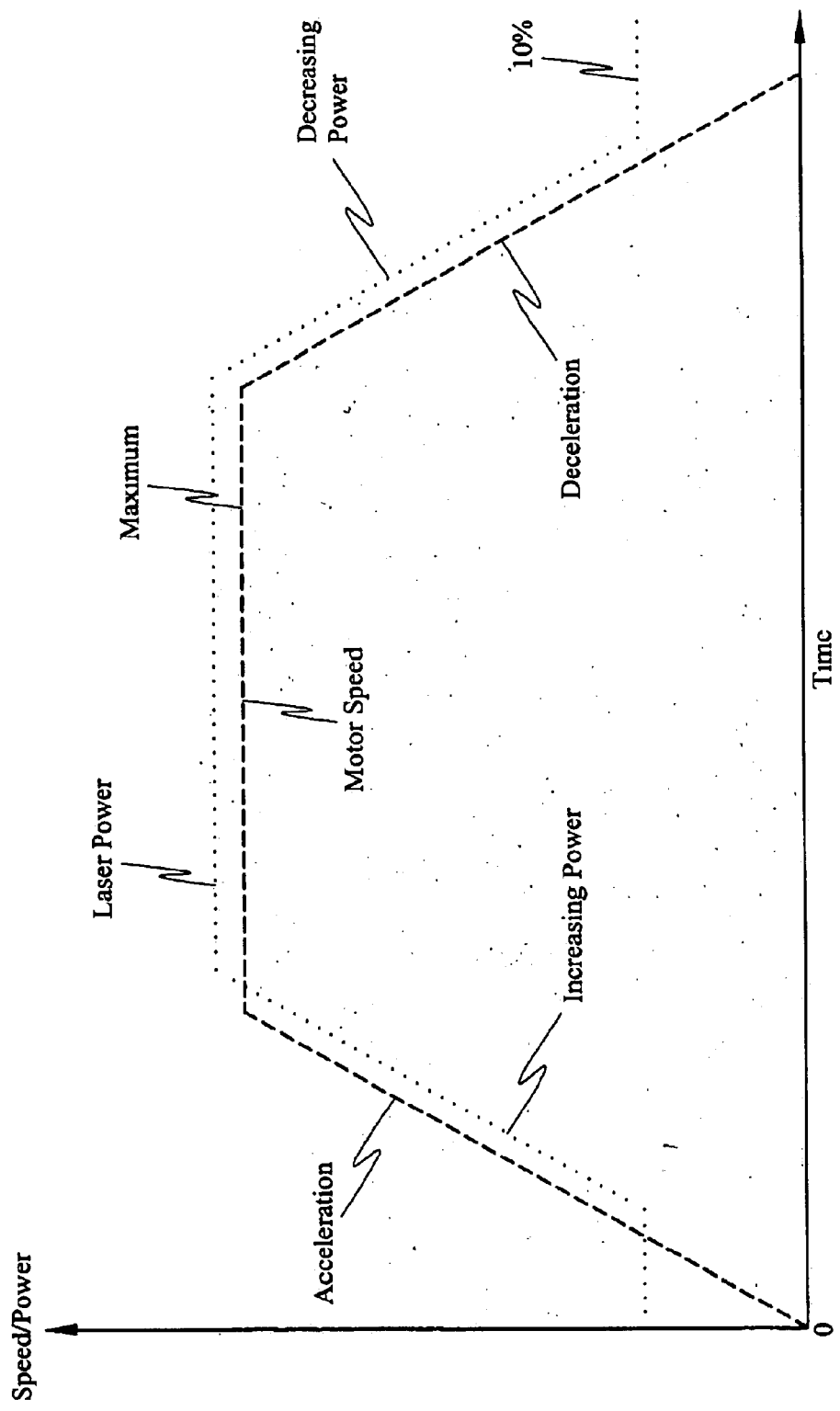
FIG. 5 shows a first graph of the galvanometric motor speed versus the laser beam intensity.

FIG. 5 shows a graph representing the problem of the acceleration, maximum speed and deceleration of the galvanometric motor driven mirrors, compared to laser beam intensity. It is a key point of the present invention that the traveling time to and from maximum required velocity of the combined X-Y beam position at the target is matched to the adjustment of the laser beam intensity; i.e. at low speed of the rotating mirror 22 low laser beam energy is required and at higher speed higher laser beam energy is required. FIG. 5 illustrates the problem when a carbon dioxide laser is used which only turns on at 10% of the maximum output power. Accordingly, with such a laser, adjustment of the laser beam intensity by simply turning on and off the laser is not possible.

Figure 6:
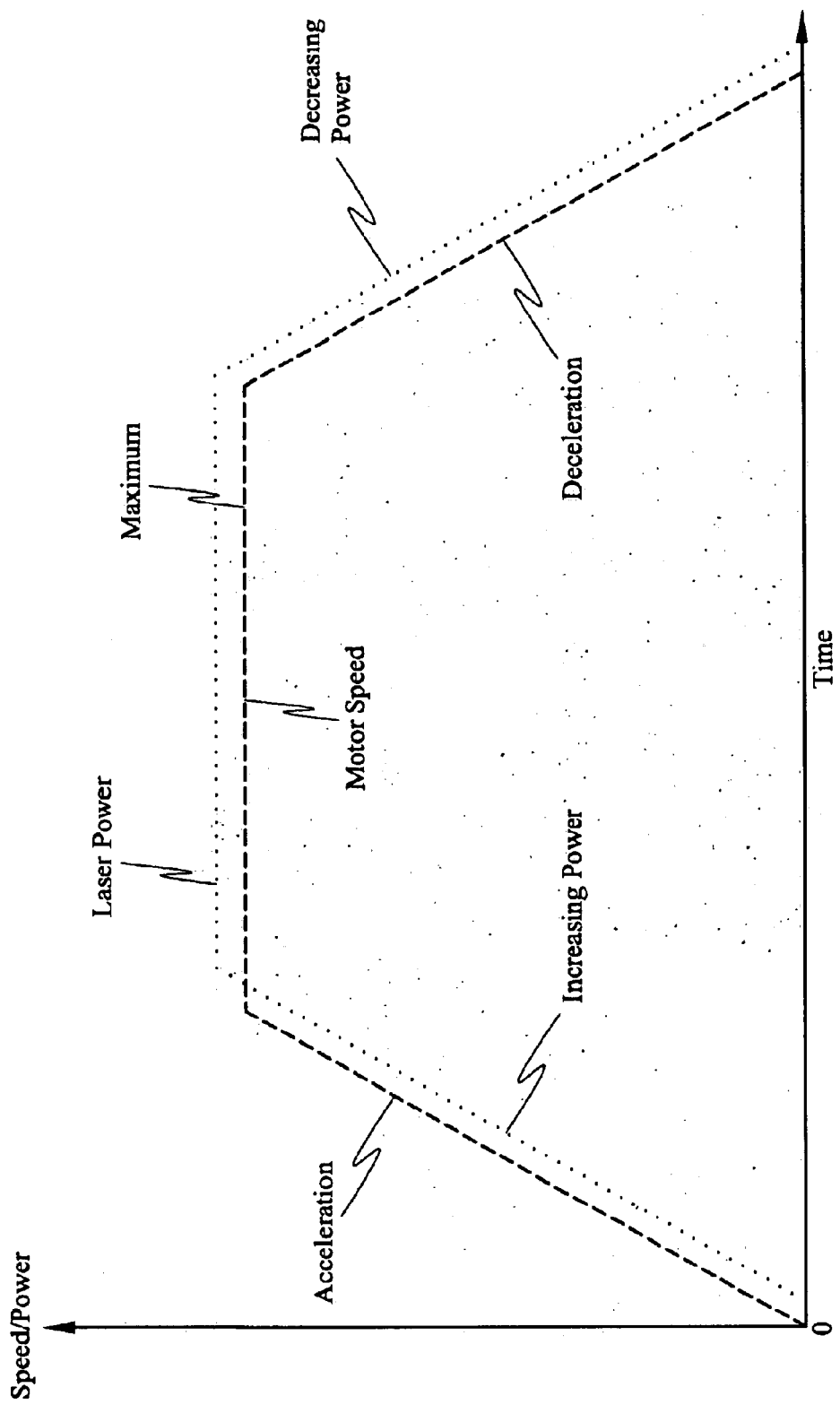
FIG. 6 shows a second graph of the galvanometric motor speed versus the laser beam intensity.

FIG. 6 shows a graph representing the galvanometric motor acceleration, maximum speed and deceleration compared to laser beam intensity adjusted by polarisation control device according to the present invention. In the graph shown in FIG. 6, laser beam intensity control is not obtained by switching on and off a laser, but the intensity of a continous laser beam at the target is adjusted by the polarisation control device and, in particular, according to the transmission curve of the opening and/or closing of a Brewster plate.

Figure 7:
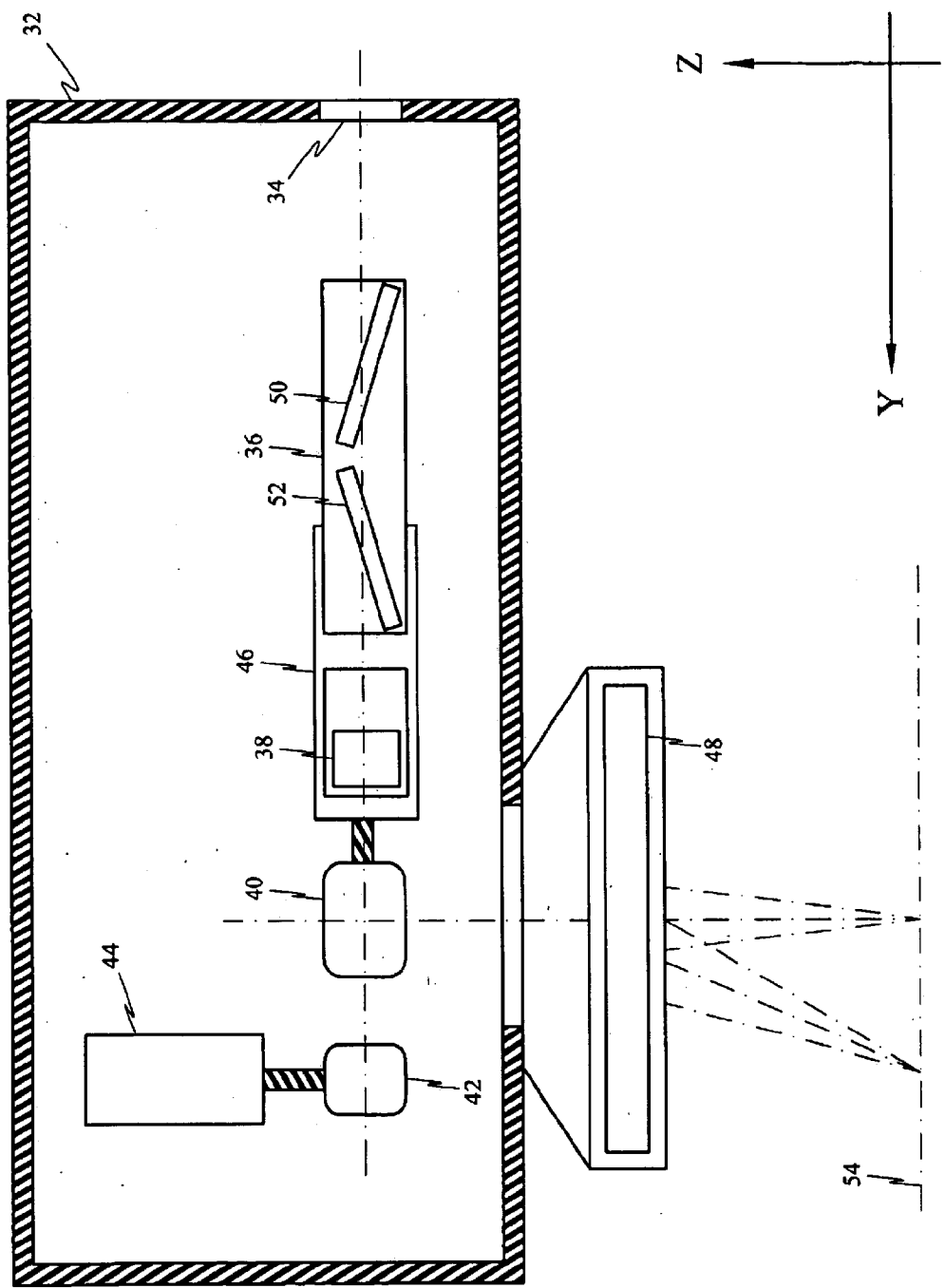
FIG. 7 shows a diagram of the laser beam targeting apparatus according to the present invention.

FIG. 7 shows a diagram of a laser beam targeting apparatus according to the present invention. The laser beam targeting apparatus is integrated into a scanning head 32 of a laser scanner into which a linearly polarized laser beam is passed through an aperture 34. The scanning head 32 comprises a polarisation control device 36 a beam expansion optic 38 of the typed described above, an X axis mirror 40, an Y axis mirror 42, to galvanometric motors 44 and 46 for rotating the two mirrors 40 and 42, respectively, and an f-theta focusing lens 48. The polarisation control device 36 of the embodiment of FIG. 7 comprises a first Brewster plate 50 and a second Brewster plate 52. In an alternative embodiment, a polarisation control device comprising a single Brewster plate could be used to achieve basically the same effect, as described below.

In the present embodiment a carbon dioxide laser is used for creating a laser beam polarised in a single direction. However, the expert will understand that any other suitable type of laser source may be used. The laser beam enters the scanning head 32 through the aperture 34 and is passed through the polarisation control device 36 in which two opposing ZnSe-Brewster plates 52, 50 are set at the relevant Brewster angles with regard to the laser beam frequency. The Brewster plates 50, 52 can be rotated through 90° to attenuate the laser beam thereby, allowing 0% to 100% of the laser beam energy to be transmitted through said Brewster plates 52, 50 when they are rotated around the laser beam axis from 0 to 90°.

The part of the laser beam energy transmitted through the Brewster plates 52, 50 passes through the beam expansion optic 38 which expands the laser beam diameter, as explained above. The laser beam transmitted through the beam expansion optic 38, increased in diameter, is deflected off the surface of the Y axis galvanometric motor driven mirror 42 to be then deflected off the surface of the X axis galvanometric motor driven mirror 40 and through the f-theta focusing lens 48 which acts to focus the laser beam to a fine point on a target plane 54. The intensity of the laser beam energy scanned across the target plane 54 is held stable by control the rotation of the Brewster plates 52, 50 as a function of the rotation of the galvanometric motor driven mirrors 40, 42.

It is important that the traveling time to and from maximum required velocity of the combined XY beam position at the target is matched to the transmission curve of the opening and/or closing of the Brewster rotation. In practice, every traveling time of the beam crossed the target plane in the X or Y direction, and importantly the combined XY directions should be fixed. It is assumed that this fixed traveling time will be determined by the capability in speed of the polarisation control device 36 to open and close the Brewster plates. Therefore, if as an example it takes 1 ms for the Brewster plates to open, within an acceptable tolerance, from 0 to 100% and, equally 1 ms to close, then the scanning head 32 and in particular the combined scanning mirrors 40, 42 should reach the maximum speed in 1 ms. Because the Brewster plates have has a transmitivity of 0% when set to the appropriate angle it is not necessary to turn off the laser beam between independent processing or marking steps of the target material.

The present invention, in its new and inventive concept, uses a polarisation device for finely adjusting the laser beam energy transmitted to the deflecting mirrors of the scan head. The attenuation of the polarisation device as described herein can easily be adjusted in close relationship to the movement of the deflecting mirrors and thus the laser spot on the target surface. Preferably, the polarisation control device is implemented using at least one Brewster plate, most preferably, one or two Brewster plates.

Expanding the laser beam using the beam expansion optic 38 increases the beam diameter at the f-theta lens 48 which in turn focuses the laser beam to allow for smaller laser beam spot sizes on the target plane 54. Providing the laser beam by use of axicon technology results in a laser beam on the target plane of more even power distribution and hence more useful profile.

The features disclosed in the above description, the claims and the drawings can be of relevance to the various embodiments of the present invention, either when taken alone or in any combination thereof.

What is claimed is:

1. A method of laser cutting or marking an article, wherein the article is processed by at least one laser scan head, said laser scan head comprising motor driven deflection means for scanning a linearly polarised laser beam across the article and a polarisation control device, wherein the polarisation control device rotates at least one Brewster plate around an axis which is parallel to the laser beam to gradually transmit or deflect the laser beam to control the level of laser beam energy of the laser beam scanning across the article in accordance with the movement of the deflection means.

2. The method of claim 1, wherein the article is scanned by a single laser scan head.

3. The method of claim 1, wherein the article is scanned by an array of laser scan heads preferably including two, three, four, five, six, seven or eight scanning units.

4. The method of claim 1, wherein each scan head is driven by X and Y galvanometric motors.

5. The method of claim 1, wherein the deflection means comprise mirrors located in a X-Y mirror chamber, and said polarisation control device controls the level of laser beam energy of the laser beam entering the X-Y mirror chamber.

6. The method of claim 1, wherein said polarisation control device can be controlled to allow two or more distinct amounts of laser beam energy to be transmitted to cut or mark the article at different depths.

7. The method of claim 1, wherein the focussed laser beam spot diameter is reduced by beam expansion before the laser beam impinges on the deflection means.

8. The method of claim 1, wherein the focussed laser beam spot diameter is profiled by axicon technology before the laser beam impinges on the deflection means.

9. The method of claim 1, wherein a single Brewster plate is used within said polarisation control device.

10. The method of claim 1, wherein the polarisation control device includes two Brewster plates which are rotated around an axis which is parallel to the direction of the laser beam.

11. The method of claim 10, wherein the rotation of the Brewster plates is controlled in relation to the movement of the deflection means.

12. A laser beam targeting apparatus, comprising at least one laser scan head, said laser scan head comprising motor driven deflection means for scanning a linearly polarised laser beam across a target and a polarisation control device comprising at least one Brewster plate, wherein the polarisation control device rotates said at least one Brewster window around an axis which is parallel to the laser beam to gradually transmit or deflect the laser beam to control the level of laser beam energy of the laser beam scanning across the target in accordance with the movement of the deflection means.

13. The apparatus of claim 12, comprising a single laser scan head.

14. The apparatus of claim 12, comprising an array of laser scan heads, preferably including two, three, four, five, six, seven or eight scanning units.

15. The apparatus of claim 12, comprising X and Y galvanometric motors for controlling the deflection means.

16. The apparatus of claim 12, wherein the deflection means comprise mirrors located in a X-Y mirror chamber, and said polarisation control device controls the level of laser beam energy of the laser beam entering the X-Y mirror chamber.

17. The apparatus of claim 12, wherein the polarisation control device comprises a single Brewster plate.

18. The apparatus of claim 12, wherein the polarisation control device includes two Brewster plates which are rotatable around an axis which is parallel to the direction of the laser beam.

19. The apparatus of claim 18, wherein the rotation of the Brewster plates is controlled in relation to the movement of the deflection means.

20. A laser scanner comprising a laser beam targeting apparatus, including at least one laser scan head, said laser scan head comprising motor driven deflection means for scanning a linearly polarised laser beam across a target and a polarisation control device comprising at least one Brewster plate, wherein the polarisation control device rotates said at least one Brewster window around an axis which is parallel to the laser beam to gradually transmit or deflect the laser beam to control the level of laser beam energy of the laser beam scanning across the target in accordance with the movement of the deflection means and a laser source.

21. The laser scanner of claim 20, wherein the laser source comprises a carbon dioxide laser.

* * * * *